United States Patent [19]

Kondratenko

[11] Patent Number: 5,609,284

[45] Date of Patent: Mar. 11, 1997

[54] METHOD OF SPLITTING NON-METALLIC MATERIALS

[75] Inventor: Vladimir S. Kondratenko, Moscow, Russian Federation

[73] Assignee: Fonon Technology Limited, London, England

[21] Appl. No.: 355,078

[22] Filed: Sep. 30, 1994

[30] Foreign Application Priority Data

Apr. 2, 1992 [RU] Russian Federation ............... 5030537

[51] Int. Cl.$^6$ ............................... B23K 15/00; B26F 3/16
[52] U.S. Cl. ............................... 225/1; 225/2; 225/93.5; 225/96; 219/121.67; 219/121.72; 219/121.73
[58] Field of Search ................................. 225/1, 2, 93.5, 225/96; 219/121.67, 121.72, 121.73, 121.75

[56] References Cited

U.S. PATENT DOCUMENTS

| | | |
|---|---|---|
| 1,720,883 | 7/1929 | Campbell et al. . |
| 3,112,850 | 12/1963 | Garibotti . |
| 3,453,097 | 7/1969 | Hafner . |
| 3,543,979 | 12/1970 | Grove et al. . |
| 3,589,883 | 6/1971 | Dear . |
| 3,610,871 | 10/1971 | Lumley . |
| 3,629,545 | 12/1971 | Graham et al. . |
| 3,695,497 | 10/1972 | Dear . |
| 3,790,362 | 2/1974 | Dahlberg et al. ........................ 225/93.5 |
| 3,795,502 | 3/1974 | De Torre ................................. 225/93.5 |
| 3,800,991 | 4/1974 | Grove et al. . |
| 3,935,419 | 1/1976 | Lambert et al. ........................ 225/93.5 |
| 4,467,168 | 8/1984 | Morgan et al. ..................... 219/121.67 |
| 4,546,231 | 10/1985 | Gresser et al. . |
| 5,084,604 | 1/1992 | Dekker et al. ..................... 219/121.67 |
| 5,132,505 | 7/1992 | Zonneveld et al. . |
| 5,138,131 | 8/1992 | Nishikawa et al. ................ 219/121.67 |
| 5,154,334 | 10/1992 | Dekker et al. . |

FOREIGN PATENT DOCUMENTS

| | | |
|---|---|---|
| 0397237A1 | 11/1990 | European Pat. Off. . |
| 2813302.0 | 3/1978 | Germany . |
| 46892 | 3/1985 | Japan ............................... 219/121.75 |
| 306088 | 12/1989 | Japan ............................... 219/121.75 |
| 4118190 | 4/1992 | Japan ............................... 219/121.67 |
| 1231813A1 | 8/1991 | U.S.S.R. . |

OTHER PUBLICATIONS

Lumley, R. M., Controlled SEparation of Brittle Materials Using a Laser, Ceramic Bulletin, vol. 48, No. 9 (1969).

Primary Examiner—Eugenia Jones
Assistant Examiner—Charles Goodman
Attorney, Agent, or Firm—Darby & Darby

[57] ABSTRACT

A method of cutting non-metallic materials, specifically glass, resides in the heating of the material by an incident beam of radiation being effected to a temperature short of its softening point, with the rate of relative displacement of the beam and of the material, and the region of the heated zone which is locally cooled being selected to form a blind crack in the material. The method provides for increasing substantially the cutting speed and accuracy, and also for controlling the depth, shape and angle of the cut face formed by the crack. The method can be employed in the automotive industry for making glass windows and mirrors, in the electronics industry for making precision backings and substrates for LED indicator panels and masks, magnetic and optomagnetic disks, in watch-making for making protective glasses, in the aircraft and space industry for making structural optics components, in construction and architecture for dimensional pattern-cutting of glass, including its integration in the glass manufacturing technology, and also in other fields of production and technologies where precision of non-metallic materials are made.

15 Claims, 3 Drawing Sheets

METHOD OF SPLITTING NON-METALLIC MATERIALS

"This is a continuation of international application Ser. No. PCT/GB93/00699, filed 2 Apr. 1993."

FIELD OF THE INVENTION

This invention relates to the splitting of bodies of brittle non-metallic material, such as glass.

BACKGROUND OF THE INVENTION

It is known to work bodies of glass or other brittle non-metallic material by removing material therefrom by abrasion or scribing, using diamond or tungsten carbide tools. Such processes involve the expenditure of much time and skill, because they are basically manual.

GB-A-1 254 120 and DE-B-1 244 346 discloses a method of splitting bodies of glass or like material into two parts by a thermal shock process produced by intense local heating of the body by means of an incident beam of coherent radiation, and abstraction of heat from the heat-affected zone in order to produce thermal shock, which causes a crack to extend through the thickness of the body.

In this method the surface of a piece of plate glass is heated by a laser beam of radiation at 10.6 µm wavelength. Some of the beam energy is reflected, while most of it is absorbed and released as heat in a thin surface layer, as thick as one wavelength. The compressive stress produced in the heated layer does not result, however, in the splitting of the glass. Further propagation of heat into the body of the glass is by thermal conduction. The splitting of the plate glass occurs as a considerable volume of the glass is heated up, and the thermally-induced stresses exceed its tensile strength. When a crack starts to form, the point of incidence of the laser beam is already displaced from the edge of the glass. Thus the evolution and propagation of the crack lags behind the movement of the laser spot. The rate of thermal splitting of the glass is rather low, and could not be increased by increasing the laser beam power, because as soon as this power exceeds a certain level, the glass becomes overheated, which is manifested by the formation of longitudinal and transverse microcracks along the line of heating.

The rate of thermal splitting is in inversely proportional to the square of the thickness of the glass to be cut. The thermal splitting rate has also been found to be dependent on the dimensions of the initial glass plate or sheet. The greater the size of the initial plate, the lower is the thermal splitting rate, resulting in a failure to split thermally a glass blank of a size exceeding 500 by 300 mm.

Apart from the low splitting speed, thermal splitting by means of a through-going crack would not provide adequately-high cutting accuracy, for the following reason. The thermal crack starts at the edge of a glass plate. By the time the crack starts, the laser beam has already moved away from the edge of the glass. Within this area, from the glass edge to the laser beam spot, a complex distribution of thermal stresses is produced in the body of the glass and along the line of irradiation before actual splitting starts.

The moment the crack develops, it propagates in leaps through the area where the thermal stresses exceed the tensile strength of the glass. This continues until the crack reaches the area directly adjoining the laser beam spot, where high compressive stresses are concentrated in the surface layers. The crack advances to by-pass the stresses. At this point, the tensile stresses at the beginning of the crack and in the bulk of the glass under the heated surface layer combined to stop further propagation of the crack.

As the crack advances, the edges of the material on both sides of the crack are forced apart, leading to mechanical stresses which assist in further propagation of the crack. In order to ensure accurate splitting, it is essential that the crack-producing forces should be symmetrical with regard to the plane of the crack. This can be easily achieved when the crack is to be along a median plane, in which case the cracks deviate only slightly if at all from the line traced out by the laser beam spot. For this reason, as the crack advances towards a boundary of the plate, the crack curves relative to the path of the laser beam, because of the asymmetry of the thermoplastic stresses.

As has already been mentioned, the rate of laser-induced thermal splitting is dependent on the dimensions of the plate being cut. Thus the rate of thermal splitting of a float glass plate, of 500 by 300 mm size and 3 mm thick, would not be higher than 0.5 mm/s whereas the rate of thermal splitting of a 30 by 100 mm plate of the same material is 8 mm/s.

The rate of thermal splitting also varies at different stages, in particular initially on startup; in the intermediate phase once steady state conditions are reached, and as the cut nears the edge of the glass plate. The speed of relative movement of the glass and of the laser beam spot should increase gradually as the crack advances through the glass.

For these reasons, it is virtually impossible to account for, and adjust properly, the rate of thermal splitting of glass or other brittle non-metallic materials by the known method. Thus, high-quality division and accuracy would not be obtained under real life conditions.

As accumulative outcome of the low speed of laser-induced thermal splitting; poor accuracy, and complexity of the control and adjustment of the thermal splitting parameters, the above method of thermal splitting by a laser beam has not found practical applications, and has been recognize as having poor prospects for the future [Ready, D *Industrial Applications of Lasers*, Moscow, MIR Publishers, 1981, pp 462–463].

A known method of cutting glass tubes includes the steps of making a score or nick along the would-be line of cut, and then heating the line of cut by a laser beam, with each tube being rotated and simultaneously advanced along the beam, followed by cooling the heated line of cut [SU Inventors' Certificate No. 857 025].

Artificially decreasing the glass strength by scoring the line of cut allows the reliability of the crack development to be enhanced, and reduces the amount of energy required for thermal splitting. As a tube is heated, compressive stresses are produced in the surface layers, and tensile stresses-in the deeper layers. As the heated glass tube is sharply cooled down, its surface layers cool quickly and tend to reduce their volume, while the inner layers oppose this tendency, so that the outer part of the glass experiences tensile stresses. As the tensile strength of glass is substantially lower than its compressive strength, the use of this method of cutting glass tubes improves substantially the efficiency of thermal splitting compared with the conventional techniques of thermal splitting without local cooling of the heated zone.

However, this method of cutting glass tubes could not be applied with adequate efficiency to the splitting of brittle non-metallic materials, such as plate or sheet glass. The underlying reason is that as glass tubes are cut over their entire circumference, by their repeated rotation in a laser beam strip, gradual building up of the thermal stresses takes place. The subsequent local cooling of the line of cut results in the thermal stressing producing a crack which, with the tube rotating, extends around the tube.

If this technique were employed for the thermal splitting of sheet or plate glass, it would not yield any appreciable increase of the cutting efficiency and accuracy, because the shortcomings and limitations already discussed apply in this technique also.

An increase of the cutting speed and accuracy is partly attained by employing the technique disclosed in SU-A-1 231 813, which discloses a method of thermal splitting in which the sheet of glass or like material to be cut is mounted on a rotary table mounted in turn on a coordinate table, and in which the progress of the crack caused by the thermal shock is monitored by a light source and detector from which data are derived to control the movement of both tables. This apparatus makes use of sphero-cylindrical focusing optics allowing an elliptical beam to be thrown on to the surface of the material being cut. This allows the heat-affected zone to be narrowed, and the temperature gradient to be increased, thus enhancing both the rate and accuracy of cutting. In this process, a coolant in the form of a jet of water entrained with air is directed at the heated zone to produce tensile stresses along the line of cut.

However, as in the other known methods of thermally splitting glass, the cutting rate attainable with this technique remains relatively low on account of the poor thermal conductivity of glass and other brittle non-metallic materials, such as glass and other ceramics, or quartz.

OBJECTS AND SUMMARY OF THE INVENTION

The present invention aims at providing a method of cutting brittle non-metallic materials by a thermal shock process in which a crack of specified shape is formed in one surface of a body of the material to be cut, the crack extending into the body of material for a specified depth.

Accordingly the present invention provides a method of forming in one surface of a body of brittle non-metallic material a blind crack of specified depth with respect to the surface and in a desired direction, including the steps of effecting relative movement between the body and an elliptical target area at which a first beam of coherent radiation impinges on the surface, along the intended direction of the crack. A stream of fluid coolant is directed at a point on the heated surface which is on the intended line of the crack, and which is displaced downstream from the target area by a chosen distance. The energy of the elliptical beam of coherent radiation is controlled so that it heats the surface to a temperature below the softening point of the material.

The rate of relative displacement of the beam-spot and the body of material to be cut should satisfy the equation:

$$V=ka(b+L)/\delta$$

where

V is the rate of relative displacement of the beam spot and the body;

k is a proportionality factor dependent on the thermophysical properties of the material and the power density of the beam;

a is the width of the beam spot on the material surface;

b is the length of the beam spot;

L is the distance from the rear edge of the beam spot to the front edge of the cooled zone, and $\delta$ is the depth of the blind crack.

This selection of the parameters of the beam, related to the cooling conditions and the splitting rate, provides for the formation in a material of given properties of a blind crack of the required depth. With the destructive tensile stresses concentrated in a narrow local zone, and with the heating of the body of the material being unnecessary the speed of cut may be increased by one hundred or more times, compared with known processes, with both the speed and accuracy of cut being unaffected by the dimensions of-the initial sheet of the material being cut. In this cutting method, with its characteristic surface heating of the material, and local cooling of the heated zone, neither the state of the opposite surface of the material being cut, nor its lateral boundaries, influence the crack-formation process. Thus, the "blind crack" is understood to be the crack of controlled shape and direction along the area of maximum thermal gradient which results from the application of a beam spot of heat, along a path of relative displacement of the beam spot and the material, followed by cooling the surface of the material at a controlled distance from the beam spot position. In cutting Na-K plate glass by this method, a speed of 1,000 mm/s has been achieved, with 10 μm accuracy.

The heat beam used should be a beam of coherent radiation of elliptical cross-section where it is incident on the material to be cut. The dimensions of the laser beam spot are selected to maintain the beam power density within the range of 0.3 to 20.0×10$^6$ W.m$^{-2}$ with the following proportions being observed:

a=0.2 to 2.0.h, and b=1.0 to 10.0.h, where a and b are respectively the lengths of the minor and major axes of the elliptical beam spot, and h is the thickness of the material.

These limitations, applied to the energy and geometric parameters of the laser beam spot, provide for the formation of a blind crack in materials of various thermophysical properties and of different thicknesses.

The cutting operation should be preceded by preheating the cutting zone, the preheat temperature being selected to satisfy the condition;

$T$=0.4 to 1.0.$\Delta T$, where $\Delta T$ is the thermal resistance of the material being cooled.

Preheating the surface of the material not only increases the cutting speed, but also increases the depth of the crack, which may be of importance when cutting materials of relatively great thicknesses.

It is also desirable to commence formation of the blind crack at a point on the surface of the body of the material which is spaced inwardly of the margins of the body.

In some cases, it could be expedient to reheat the line of cut after the blind crack has been produced in the material. Such reheating either increases the depth of the crack substantially or splits the material completely through. Moreover, the rate of relative displacement of the material to the beam spot during reheating may be significantly higher than during the initial process for forming the blind crack.

In cutting along a closed path, the beam should be moved tangentially to the line of cut at any point along its path.

Prior to cutting along a closed path, the surface of the material should be scored along the path to a gradually-increasing depth, with a subsequent heating and cooling starting from the deepest part of the score.

When cutting along a closed path with relatively-small radii of curvature, the reheating should be performed with the beam off-set radially outwards of the path.

The above special features provide for attaining high accuracy of the geometric dimensions of the articles being cut, and for their cut faces requiring no additional machining.

In order to control the shape and direction of the crack, the heating should be carried out with a beam of which the energy is distributed along the path of its relative displacement, while the position of the cooling zone on the surface of the material is also controlled with respect to the beam spot position.

To produce articles with decorative edge faces, the heating should be carried out with a beam spot of elliptical shape, with its major axis at an angle of 3° to 45° to the line of relative displacement.

The disclosed method provides not only for increasing substantially the cutting speed of accuracy, but also for reliable control over the shape, direction and depth of the resultant crack.

DESCRIPTION OF THE DRAWINGS

The invention will now be described by way of example with reference to the accompanying drawings, in which.

DETAILED DESCRIPTION OF THE PREFERRED EMBODIMENTS

Figure 1:
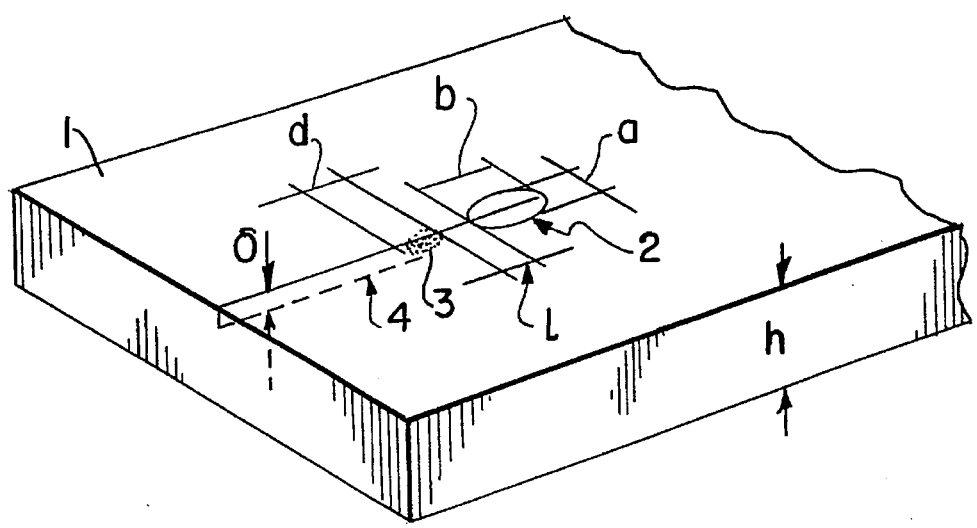
FIG. 1 illustrates schematically how a blind crack is formed in the cutting of non-metallic materials, in accordance with the present invention.

The cutting of non-metallic materials, specifically glass, under the action of thermoplastic stresses, resides in the following. As a surface of a piece 1 of non-metallic material, such as glass (FIG. 1) is heated with an incident beam of coherent radiation, considerable compressive stresses are produced in the surface layers of the material 1, which, however, do not result in its cracking or splitting. In order for the material to be cut, the following conditions should be satisfied. Firstly, the beam should be able to heat the surface of the material to be cut, that is its radiation should be at a wavelength with respect to which the material to be cut is virtually opaque. Thus, in the case of glass, the radiation should be in the infra-red range, with a wavelength in excess of 2 µm, such as the beam of a $CO_2$ laser, with its 10.6 µm wavelength; of a CO laser with its wavelength of about 5.5 µm, or of an HF laser with its wavelength of 2.9 µm. Secondly, as the surface of the material is being heated, its maximum temperature should not exceed the softening point of the material. Otherwise, if the plasticity limit of the material is exceeded, residual thermal stresses would set in after the material on both sides of the line which had been cut had been cooled, resulting in the material cracking uncontrollably.

A stream or jet of a suitable coolant is directed at an area 3 of the material 1 in the wake of the advancing beam spot 2, to bring about sharp localize cooling of the surface layer along the line of cut. The temperature gradient thus produced induces tensile stresses in the surface layers of the material 1 and, as these stresses exceed the tensile strength of the material, the latter develops a blind crack 4 penetrating the material down to the parts thereof which are under compression. Hence, the blind crack 4 is formed in the material down to the interface of the heated and cooled zones, that is in the area of the maximum thermal gradient. The depth, shape and direction of the crack are determined by the distribution of the thermoplastic stresses, which in turn are dependent on several factors.

These factors are:

the parameters of the beam spot, namely the power density, and the dimensions and shape of the beam spot;

the rate of relative displacement of the beam spot and the material;

the thermophysical properties, quantity and conditions of supply of the coolant to the heated zone, and the thermophysical and mechanical properties of the material to be cracked, its thickness, and the state of its surface.

To optimize the cutting cycle for different materials, it is necessary to establish the proper relationship between the major parameters and variables of the cutting process.

It has been found from experiments that, depending on the dimensions of the beam spot 2 and its spacing from the area 3 on which the coolant stream falls, the speed V of the relative displacement of the beam and of the material, and the depth 6 of the blind crack, are related by the expression:

$$V = ka(b+L)/\delta$$

where

V is the rate of relative displacement of the beam spot and of the material;

k is a proportionality factor dependent on the thermophysical properties of the material and the beam power density;

a is the width of the beam spot;

b is the length of the beam spot;

L is the distance from the rear edge of the beam spot to the front edge of the cooled zone, and δ is the depth of the blind crack 4.

In determining the maximum power density of the laser beam employed for cutting the material, the maximum temperature of the surface-layer of the material may not exceed its softening point. Thus, the minimum power density value of about $0.3 \times 10^6$ $W.m^{-2}$ is acceptable for the lower-melting grades of thick glass at low thermal splitting speeds. The maximum power density value of $20 \times 10^6$ $W.m^{-2}$ may be used in cutting high-melting quartz glass, conundrum and other materials with either a high softening point or a high value of thermal conductivity.

As the temperature of the surface of the material 1 is directly dependent on the time of its exposure to the laser beam 2, the use of a beam 2 of elliptical instead of circular cross-section extends the time of the heating of each point on the surface of the material 1 along the cutting line for the same rate of relative displacement. Hence, with a set power density of the laser beam 2, and with the same distance from the laser beam spot to the front edge of the coolant spot, which is essential for maintaining the required depth of heating of the material 1, the greater the laser beam spot is extended in the displacement direction, the greater the maximum rate of relative displacement of the laser beam spot and material which can be achieved while operating in accordance with the invention.

Moreover, any significant narrowing of the heating zone, where the laser beam 2 impinges on the material transverse to its cutting direction enhances the accuracy of cutting.

If the laser beam spot 2 is narrowed excessively, this might lessen the resultant thermal stress, thus threatening the splitting action. Experiments have yielded the optimized relationships between the lengths of the minor and major axes of the laser beam spot 2 of elliptical cross-section, and the thickness of the material being cut:

$a$=0.2 to 20.0 h, $b$=1.0 to 10.0 h, where a and b are, respectively, the lengths of the minor and major axes of the elliptical beam spot 2; and h is the thickness of the material 1.

When the width of the laser beam spot 2 is less than 0.2 of the material thickness, that is if a <0.2h, the efficiency of the cutting process is impaired on account of the diminishing value of the thermal tensile stress action in the cooling zone. Putting this right requires reducing the cutting speed and decreasing the depth of the crack 4, to say nothing of the greater probability of overheating the material along the cutting line, resulting in residual thermal stresses. On the other hand, with a >20h, the cutting accuracy is adversely affected by the unnecessary width of the heating zone.

The reasons for stipulating the b=1.0 to 10.0 h range of the lengths of the major axis of the laser beam spot are with b<h, the cutting speed is too low, and with b >10 h, the cutting accuracy is impaired.

The rate of thermal splitting is in inversely proportional to the depth of the blind crack 4 being formed, that is the higher the rate of the relative displacement of the beam and material, the smaller is the depth of the crack 4. When relatively thin sheet materials are cut, of thickness from 0.3 to 2.0 mm, the depth of the microcrack 4 formed even at such high cutting speeds as 100–500 mm/s is sufficient for subsequent final splitting or breaking of adequate quality along the path. However, when thicker plate materials 1 are cut, even low rates of relative displacement produce a shallow microcrack, making the final splitting therealong quite difficult.

Figure 2:
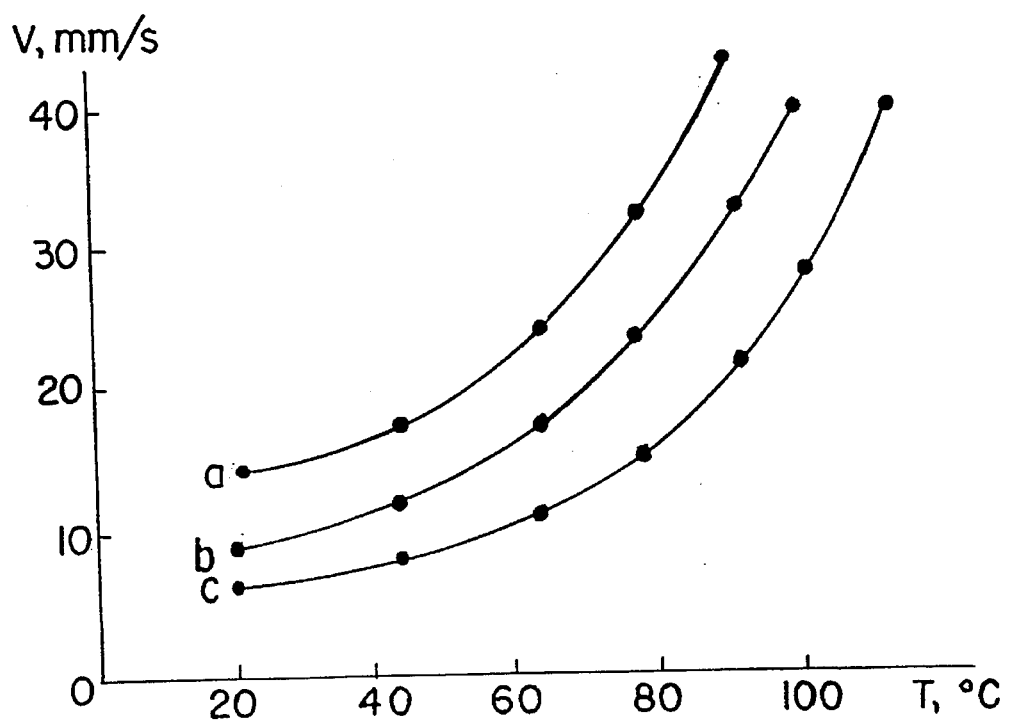
FIG. 2 illustrates graphically the dependence on the speed of cutting non-metallic materials in accordance with the present invention on the temperature to which the material is preheated.

Experiments have shown that the preheating of the material 1 being divided to a temperature within the range of T=0.4 to 1.0 $\triangle$T, where $\triangle$T is the thermal resistance of the material to cooling, sharply increases the thermal splitting rate. FIG. 2 illustrates graphically the dependence of the thermal splitting rate on the preheat temperature for common-grade plate glass, of 6 mm thickness—curve a; of 10 mm thickness—curve b, and of 25 mm thickness—curve c.

Experimental studies have proved that preheating the material to be cut to a temperature below 0.4$\triangle$T is inefficient, for the productivity thus gained is minimal, whereas raising the preheat temperature above $\triangle$T is ill advisable, for when the cutting line is subsequently heated by the laser beam and cooled locally by the coolant, the threat of uncontrolled cracking of the material under the action of the thermal stress becomes real.

Figure 3:
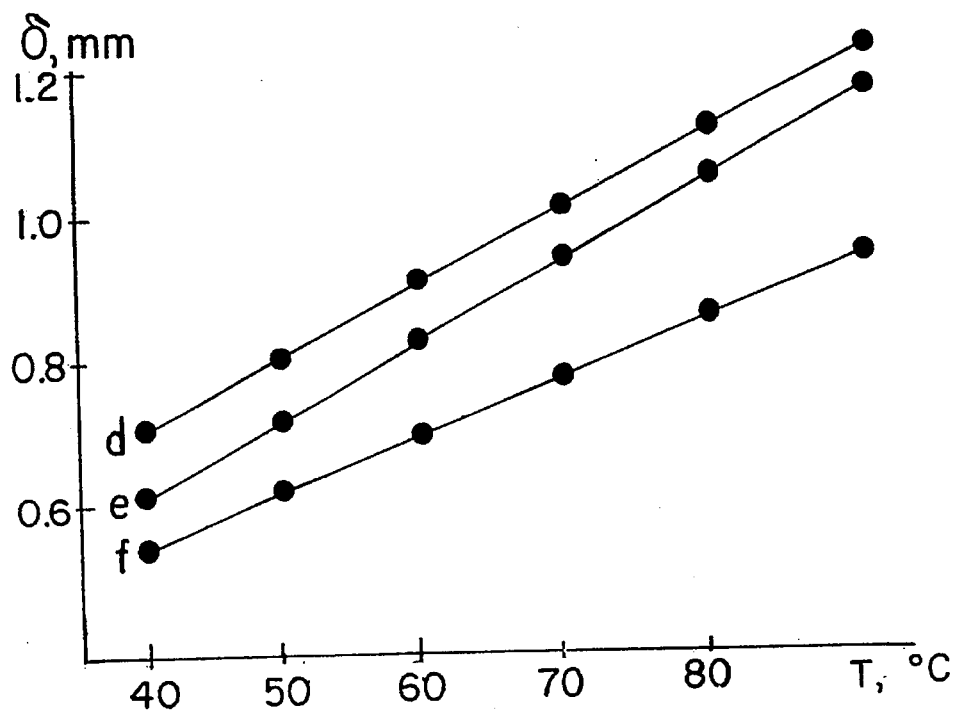
FIG. 3 illustrates graphically the dependence on the depth of the blind crack on the preheat temperature.

Besides providing for increasing the cutting speed, preheating the material has been found to increase the depth of the blind crack formed. Experiments have revealed linear dependence of the depth of the crack on the preheat temperature of the surface of the material being cut. FIG. 3 of the appended drawings shows the corresponding diagrams for the plate glass mentioned above, curves d, e, f.

It has been further found that in certain cases it is essential to reheat the cutting line either to increase the depth of the blind crack 4 (FIG. 1) or to split the material completely along the line of cut. The method in accordance with the invention produces in the material 1 a blind crack or microcrack 4, which in some cases is relatively shallow. In the case of rectilinear cutting, the final division of the material 1 into blanks is performed by breaking the scored material 1 either manually or with the aid of specific mechanisms or devices. However, the manual breaking operating would not support adequately high quality of the articles obtained, and results in rejects. Furthermore, particularly great difficulties are presented by breaking out of a blank of a closed curvilinear outline. To solve this problem, the line of cut should be reheated, either by the laser beam 2 or by another suitable heat source. The thermal stresses yielded by the reheating bring about further deepening of the blind crack 4. The degree of the deepening of the crack 4 is dependent on the power of the heat source, the cutting speed, the thickness of the glass or other material being cut, and on the depth of the initial microcrack. By varying these parameters appropriately, it is possible to attain the required degree of deepening of the crack 4, up to the complete splitting.

Figure 4:
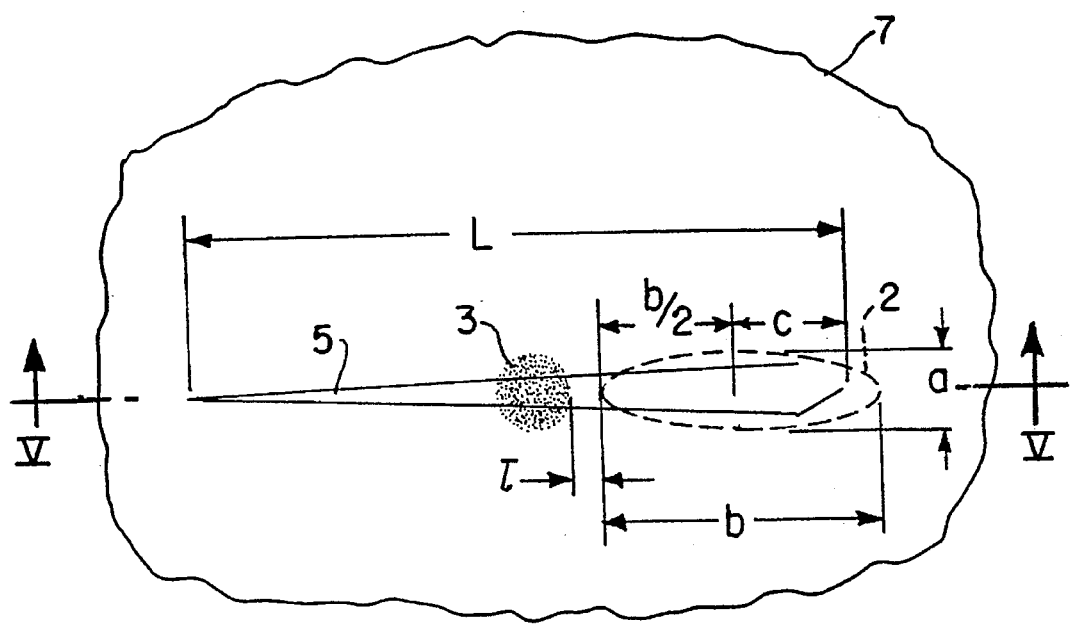
FIGS. 4 and 5 (FIG. 5 being a sectional view taken on line V—V of FIG. 4) illustrate schematically the operation of scoring the material to a gradually-increasing depth prior to cutting it along a curvilinear closed path.

As has already been stated, in the process of cutting along a curvilinear closed path (FIG. 4), the beam 2 should be moved strictly tangentially to the cutting line at any point along the path. This is explained, in the first place, by the dependence of the thermal splitting rate on the angle between the major axis of the beam spot and the direction of its relative advance. With the major axis of the beam spot at an angle to its direction of relative movement, the value of the displacement speed has to be reduced, down to its minimum value when the major axis of the beam spot 2 is normal to its direction of movement. When the ratio b/a of the major and minor axes of the elliptical beam 2 decreases, the difference between their effective speeds V also decreases. In the second place, the necessity of moving the beam 2 strictly tangentially to the line of cut, particularly in the course of reheating for the final splitting, is associated with the requirement that the cutting should produce a high-quality end face perpendicular to the surface of the material of the article yielded by the cutting. As the elliptical beam 2 deviates from the tangent to the cutting line, asymmetrical distribution of thermal stresses results in the plane of the crack 4 ceasing to be normal to the material surface, which in certain cases cannot be tolerated.

Figure 5:
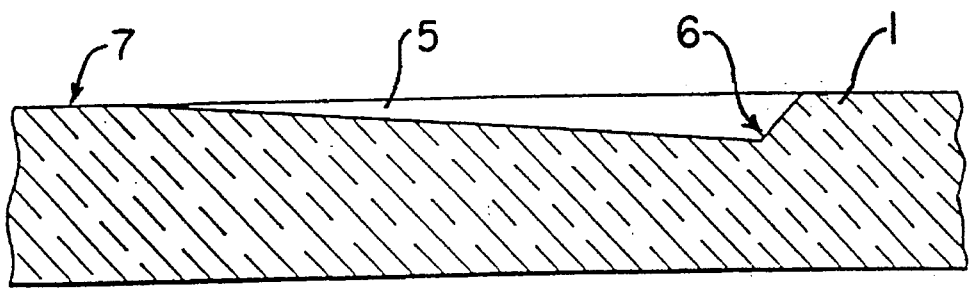

There is still another problem associated with cutting along a closed curvilinear path. In such cutting the actual cutting line tends to become deflected from the predetermined path in the area where the path meets itself, which is because of the combination of similar tensile stresses at present at the starting point of the crack 4. To preclude this, prior to starting the cutting, a score or nick 5 (FIGS. 4, 5) of a gradually-increasing depth is made along the cutting line. The ensuing successive heating and cooling of the material being cut starts from where the score 5 is at its deepest part 6 of the score 5. Thus, the thermal crack would commence at this deepest part 6 of the score 5, and the closing of the path would begin at a point 7 where the depth of the score 5 is minimal. This allows the tensile stresses to be reduced and virtually eliminates the crooking of the cutting line as a curvilinear outline is closed.

It has been found from experiments that the optimum length of the score 5 can be determined from the expression:

$$V = ka(b+L)/\delta$$

where

V is the rate of relative displacement of the beam spot and of the body;

k is a proportionality factor dependent on the thermophysical properties of the material and the beam power density;

a is the width of the beam spot;

b is the longitudinal cross-sectional size of the beam spot 2;

L is the distance from the rear edge of the beam spot to the front edge of the cooled zone, and δ is the depth of the blind crack 4.

In this, as has already been mentioned, the heating and subsequent cooling of the cut line are commenced at the deepest point 6 of the score 5, that is when the centre of the beam spot 2 approaches the deepest point 6, or else when it is spaced by at least a distance c from the extreme end of the score. Experiments have yielded the optimized range of the values of the distance c from the centre of beam spot 2 to the extreme end of the score at the moment when the heating is started, expressed as follows:

$$0 \leq c \leq \frac{1}{2}.$$

Furthermore, it is essential that the score 5 should be a narrow relatively-deep single depression or nick, and not a scratch with longitudinal and transverse microcracks that would impair the quality of the divided surface.

When the cutting is conducted along a curvilinear outline with relatively small curvature radii, the reheating is preferably performed with the heat beam offset from the centre towards the border of the curved outline. The expedience of this technique is explained as follows. In rectilinear cutting, the fields of thermoplastic stresses remain permanently symmetrical with respect to the path of the displacement both during the primary heating, as the microcrack is being formed, and that in the course of the reheating when the material is finally split along the microcrack. However, when the cutting is along the curve outline, this symmetry of thermoplastic stresses is disturbed by the influence of the already-heated volumes of the material within the curve, and this influence is the greater, as the radius of the curvature of the curve decreases. This influence becomes particularly pronounced during the reheating of the curved path, tending to deflect the crack from extending normal to the surface of the material, and thus adversely affecting the cutting accuracy and the cut face quality after the removal of the surplus material. Therefore, to enhance the cutting accuracy and cut face quality in cutting along small curvature radii, the beam should be preferably offset from the curve towards the border during the reheating. The value of this offset depends on the cutting speed, the radius of curvature, the size of the beam spot, and the thickness of the material, and is found from experience.

In most cases of producing articles of glass and like non-metallic materials, in the electronics, instrument making and like industries, strict requirements are put on the geometrical dimensions and quality of their edge faces, such as the requirement of strict perpendicularity of the plane of a crack to the surface of the material itself. The above-described techniques of performing the method in accordance with the invention are specifically aimed at optimizing the solution of this problem. However, there are other fields of technology where the quality of the edge faces of articles of glass and like non-metallic material is expected to meet quite different requirements, such as when it is desirable to produce facetted or slanting faces, or else an edge face with a decorative raised pattern. To attain this, it is necessary in each case to alter the dynamic distribution of thermo elastic stresses in the cutting zone by redistributing the energy asymmetrically with respect to the cutting line, and also by aiming at a required profile of distribution of the fields of thermoelastic stresses by some appropriate offsetting of the point of impact of the coolant relative to the beam spot.

Figure 6:
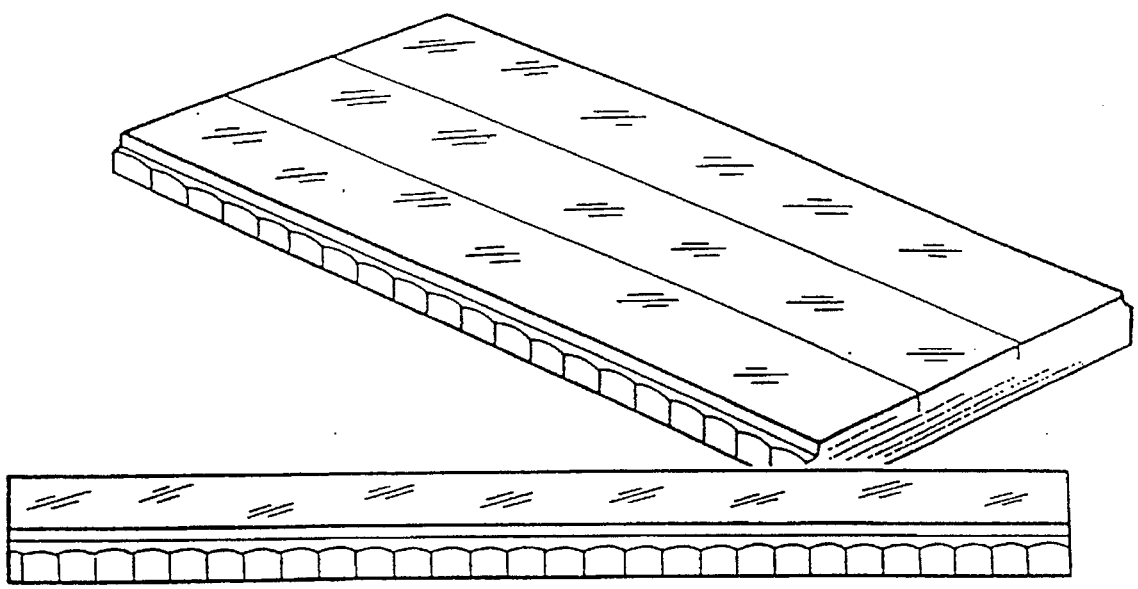
FIG. 6 illustrates a decorative raised-pattern edge face produced in accordance with an embodiment of the present invention.

Thus, a decorative raised-pattern edge face can be produced when the symmetry of the thermal field with respect to the path of displacement is disturbed by rotating the beam 2 (FIGS. 4, 5) of elliptical cross-section through a chosen angle relative to the speed vector. The thermal stresses thus produced, with their asymmetrical distribution with respect to the plane included in the centre of the beam spot 2, and perpendicular to the displacement direction, lead to discrete splitting of the material in a decoratively-shaped contour (FIG. 6) along the line of heat.

A decorative edge face is produced with enhanced reliability when a cutting line is marked out in advance as a blind thermal crack along the required path by the previously-described techniques, and then this cutting line is reheated with the beam of elliptical cross-section turned at an angle relative to the cutting line. This results in the superpositioning of the tensile stresses concentrated at the edge of the microcrack and the stresses produced in the reheating of the cutting line with the asymmetrical beam. The dynamics of the distribution of the stresses through the volume of the material are of a complex nature dependent on such factors as the elliptical beam spot 2, its angle φ relative to the displacement direction, the effective power density of the beam, the thickness of the glass or other material, and the rate of relative displacement of the beam and the material.

The splitting of the material 2 in a decorative complex profile takes place as follows. As the inclined beam 2 of elliptical cross-section moves relative to the material during reheating, an inclined crack is formed, propagating at an angle to the direction determined by the initial microcrack. This propagation of the crack 4 (FIG. 1) occurs in steps in those areas in which the stresses exceed the ultimate strength of the material. As the stresses diminish In value with distance from the microcrack, dependent on the thermal splitting parameters, the development of the crack ceases, while the onset of tensile stresses at the newly formed crack alters the profile of the resultant stresses, so that the inclination of the crack changes from that of the initial crack. As the beam moves on, this crack-formation cycle repeats itself.

The existence of the initial microcrack is not mandatory for producing a decorative edgeface. However, when the microcrack already exists, a slanting facet is formed which, in addition to enhancing the appearance of the edge face of the article, precludes a person handling the article from having his or her hand cut inadvertently by a sharp edge.

The decorative working of the edge faces of glass articles by thermal splitting may be employed for the decorative finishing of artistic items and manufactured consumer goods made of glass, such as mirrors, components of luminaires, colour music panels and the like, instead of complicated and labour-intensive operations of diamond cutting and faceting followed by chemical polishing in a hydrofluoric acid solution.

A preferred method of the present invention is performed as follows. An initial piece of blank of a material, such as a glass sheet, is placed onto the heated panel of a coordinate table. The table is actuated to move with the blank, and a scoring mechanism including diamond point is urged with an increasing load against the glass surface to score it. The beam of a laser is directed through a focusing lens on to the glass surface, to strike the line of score. A jet of an air/water mixture (the coolant) is turned on at the moment when the nozzle points at the deepest part of the score. A microcrack is formed at the spot where the coolant jet hits the glass, and develops along the line of cut as the blank moves relative to the laser beam and to the jet nozzle. As the cutting line prescribed by the developing microcrack closes to form an endless path, the supply of coolant to the heated zone is discontinued. However, movement of the blank and heating of the cutting line with the laser beam is continued for another full revolution, so that the glass becomes split along the line marked out by the microcrack. When the crack propagates through the thickness of the material along the endless path, the laser beam is turned off, the coordinate table is halted, and the blank is removed from the table. With the surplus material removed, the required article is obtained, that is a precision-cut glass disk.

EXAMPLES

Sheet glass 1.2 mm thick was cut using a 25 W $CO_2$ laser of LGN-703 Type. Disks 31.2 mm in diameter were cut out, to be used as watch glasses. The glass blank was preheated to 70° C. The laser beam was focused by a spherocylindrical lens into a beam of elliptical cross-section, of 1.4×3.0 mm dimensions. A 4 mm score along the cutting line was made by a diamond pyramid of 120° angle at the apex. The cutting speed was 20mm/s. The cutting accuracy was 10 μm.

In addition to cutting plate and sheet glass, the disclosed method was employed for cutting such non-metallic materials as single-crystal and fused quartz, glass ceramic, leucosapphire, ceramics.

The results of the testing of the disclosed method of cutting non-metallic materials in the cutting of different grades of glass and quartz with varying parameters of the laser beam and other process parameters are summed up in Table 1.

An analysis of the testing results suggests the following conclusions.

The efficiency of the cutting process in terms of the cutting speed and accuracy, the quality of the edge face of the material produced by the cutting is influenced not only by the major parameters of the process, such as the longitudinal and transverse dimensions of the laser beam spot on the material surface, the beam power density, the location and conditions of the supply of the coolant to the heated zone, the thickness and properties of the material being divided, but also by the strict observance of the prescribed relationships of these parameters.

In this, in dependence on the combination of the above parameters, high-quality cutting can be attained, yielding a smooth flawless edge face which is strictly normal to the material surface. As demonstrated by Examples 20–22 (marked with '*' in Table 1), when the line of cutting defined by a 0.6 mm deep microcrack was reheated with a laser beam of elliptical cross-section directed at an angle to the advance direction, a raised pattern decorative edge was produced.

Examples 17–19 (marked with '' in Table 1( ) refer to a glass grade with thermal resistance $\triangle T$ −120° C., i.e. in these cases the temperature T of preheating the glass surface was related to the thermal resistance value, as follows: in Examples 17, 18, 19**, respectively, $T=0.4\triangle T$, $T=0.7\triangle T$, $T=\triangle T$.

It can be seen from the Examples 1 to 4 and 5 to 8 that as the cutting speed was decreased, the depth of the crack diminished.

TABLE 1

Results of Testing the Method of Cutting Non-Metallic Materials

| | | Working Parameters | | | | | | | | | | | | Test Results | | |
|---|---|---|---|---|---|---|---|---|---|---|---|---|---|---|---|---|
| | | Heat beam parameters | | | | | | | | | | | Cutting accuracy, mm | Q-ty of rejects by residual thermal stresses, % | Repeatability % |
| Ex. No. | Material | a, mm | b, mm | Q, ×10$^6$ W/m$^2$ | h, mm | l, mm | V, mm/s | δ, mm | T, °C | φ, deg. | k | k/Q | | | | |
| 1 | 2 | 3 | 4 | 5 | 6 | 7 | 8 | 9 | 10 | 11 | 12 | 13 | 14 | 15 | 16 | |
| 1 | Glass | 2 | 11 | 1.5 | 6 | 20 | 16 | 0.6 | 20 | 0 | 0.15 | 0.1 | 0.05 | 0 | 100 | |
| 2 | Glass | 2 | 11 | 1.5 | 5 | 17 | 16 | 0.6 | 20 | 0 | 0.14 | 0.09 | 0.05 | 0 | 100 | |
| 3 | Glass | 2 | 11 | 1.5 | 5 | 17 | 10 | 1.0 | 20 | 0 | 0.18 | 0.12 | 0.05 | 0 | 100 | |
| 4 | Glass | 2 | 11 | 1.5 | 5 | 17 | 6 | 1.3 | 20 | 0 | 0.14 | 0.09 | 0.05 | 10 | 100 | |
| 5 | Glass | 4.5 | 17 | 0.6 | 6 | 28 | 7 | 1.75 | 20 | 0 | 0.06 | 0.1 | 0.1 | 0 | 100 | |
| 6 | Glass | 4.5 | 17 | 0.6 | 6 | 28 | 9.3 | 1.4 | 20 | 0 | 0.06 | 0.1 | 0.1 | 0 | 100 | |
| 7 | Glass | 4.5 | 17 | 0.6 | 6 | 28 | 14 | 1.3 | 20 | 0 | 0.09 | 0.15 | 0.1 | 0 | 100 | |
| 8 | Glass | 4.5 | 17 | 0.6 | 6 | 28 | 18.8 | 1.0 | 20 | 0 | 0.09 | 0.15 | 0.1 | 0 | 100 | |
| 9 | Glass | 4.5 | 17 | 0.6 | 6 | 35 | 7 | 2.1 | 20 | 0 | 0.06 | 0.1 | 0.1 | 0 | 80 | |
| 10 | Glass | 4.5 | 17 | 0.6 | 6 | 35 | 9.3 | 1.35 | 20 | 0 | 0.05 | 0.08 | 0.1 | 0 | 92 | |
| 11 | Glass | 8.6 | 14.3 | 0.3 | 6 | 10 | 6 | 3.0 | 20 | 0 | 0.1 | 0.33 | 0.5 | 0 | 40 | |

TABLE 1-continued

Results of Testing the Method of Cutting Non-Metallic Materials

| Ex. No. | Material | Working Parameters ||||||||||| Test Results |||
|---|---|---|---|---|---|---|---|---|---|---|---|---|---|---|---|
| | | Heat beam parameters ||| | | | | | | | | Cutting accuracy, mm | Q-ty of rejects by residual thermal stresses, % | Repeatability % |
| | | a, mm | b, mm | Q, ×10⁶ W/m² | h, mm | l, mm | V, mm/s | δ, mm | T, °C | φ, deg. | k | k/Q | | | |
| 1 | 2 | 3 | 4 | 5 | 6 | 7 | 8 | 9 | 10 | 11 | 12 | 13 | 14 | 15 | 16 |
| 12 | Glass | 1.4 | 10.7 | 2.2 | 3 | 4 | 39 | 0.3 | 20 | 0 | 0.57 | 0.26 | 0.01 | 0 | 100 |
| 13 | Quartz | 1.5 | 1.5 | 20 | 3 | 4 | 20.4 | 0.08 | 20 | 0 | 0.2 | — | 0.05 | 10 | 90 |
| 14 | Quartz | 1.4 | 1.4 | 22 | 3 | 4 | 24.2 | 0.03 | 20 | 0 | 0.12 | — | 0.2 | 88 | 20 |
| 15 | Quartz | 1.2 | 23 | 1.0 | 6 | 4 | 14 | 0.5 | 20 | 0 | 0.22 | 0.22 | 0.1 | 18 | 70 |
| 16 | Photoglass | 4.6 | 4.6 | 1.5 | 2.3 | 4 | 18 | 0.35 | 20 | 0 | 0.16 | 0.11 | 0.5 | 0 | 50 |
| 17 | Glass | 2 | 11 | 1.5 | 6 | 18 | 18 | 0.6 | 48** | 0 | — | — | 0.05 | 0 | 100 |
| 18 | Glass | 2 | 11 | 1.5 | 6 | 18 | 45 | 0.82 | 84** | 0 | — | — | 0.05 | 0 | 100 |
| 19 | Glass | 2 | 11 | 1.5 | 6 | 18 | 120 | 1.04 | 120** | 0 | — | — | 0.05 | 33 | 60 |
| 20 | Float Glass | 2.5 | 8 | 1.4 | 6 | — | 18 | 0.6* | 20 | 3 | — | — | — | 0 | 50 |
| 21 | Float Glass | 2.5 | 8 | 1.4 | 6 | — | 15 | 0.6* | 20 | 10 | — | — | — | 0 | 100 |
| 22 | Float Glass | 2.5 | 8 | 1.4 | 6 | — | 12 | 0.6* | 20 | 45 | — | — | — | 0 | 64 |

I claim:

1. A method of separating two portions of a body of brittle non-metallic material from each other including the step of forming a blind crack extending into the body to a given depth from a surface thereof, and in an intended direction along the surface, by effecting relative movement at a rate of relative displacement between the body and an elliptical target area on the surface thereof, said target area having a transverse minor axis and a longitudinal major axis, and being formed by directing an elliptical beam of coherent radiation towards the surface, the elliptical beam incident on the surface forming a spot, the spot having a major axis aligned substantially along the intended direction of the crack, and controlling the energy of the beam so that the beam heats the surface to a temperature below the softening point of the material while simultaneously directing a stream of fluid coolant at an area of the heated surface which constitutes a cooling zone in the intended direction, the fluid coolant being displaced behind the heated target area by a chosen distance, wherein the rate of relative displacement between the beam and the body satisfies the equation:

$$V = ka(b+L)/\delta$$

where

V is the rate of relative displacement of the beam spot and the body;

k is a proportionality factor dependent on the thermophysical properties of the material of the body and a beam power density of the beam;

a is the length of said transverse minor axis;

b is the length of said longitudinal major axis;

L is the distance from the rear edge of the heat beam spot to the from edge of the cooling zone; and δ is the depth of the blind crack.

2. The method of claim 1 in which at least a volume of the body containing and bordering the intended direction of the crack is preheated.

3. The method of claim 2 in which the body is preheated to a chosen temperature related to a desired depth of the crack.

4. The method of claim 3 in which the body is preheated to a temperature satisfying the condition:

$$T = (0.4 \text{ to } 1.0)\Delta T$$

where $\Delta T$ is the thermal resistance of the body of material to cooling.

5. The method of claim 1 and including the further step of post heating the body, after the blind crack has been formed, along the direction of the crack and to an extent sufficient to cause the depth of the crack to increase further.

6. The method of claim 5 in which the post heating is effected by means of a second beam of radiation impinging on the same surface and moved relatively to the body along a path coincident with, or parallel to, the crack.

7. The method of claim 1 in which, when commencing forming the blind crack, the elliptical beam is initially incident at a point spaced inwardly from the borders of the body.

8. The method of claim 7 in which the elliptical beam traces out a closed curve on the body surface, and in which the direction of the major axis of the elliptical target area is kept at a constant orientation to a tangent to the curve at the centre of the target area.

9. The method of claim 8 in which the major axis is coincident with, or parallel to, the tangent.

10. The method of claim 8 in which the major axis extends at a fixed angle to the tangent.

11. The method of claim 10 in which, in order to produce articles with a decorative raised-pattern edge face, the major axis of the elliptical target area is at an angle of 3° to 45° to the tangent.

12. The method of claim 1 wherein the material has a thickness h and the size of the target area satisfies the condition of maintaining the beam power density over the area within the range of (0.3 to 20.0)×10⁶ Wm⁻², with the following proportions being observed:

$$a = (0.2 \text{ to } 2.0)h,$$

$$b = (1.0 \text{ to } 10.0)h,$$

where a and b are, respectively, the lengths of the minor and major axes of the elliptical target area.

13. A method of separating two portions of a body of brittle non-metallic material from each other along a curvilinear outline of relatively small curvature radii including the step of forming a blind crack extending into the body to a given depth from a surface thereof, and in an intended direction along the surface, by effecting relative movement at a rate of relative displacement between the body and an elliptical target area on the surface thereof, said target area having a transverse minor axis and a longitudinal major axis, and being formed by directing an elliptical beam of coherent radiation towards the surface, the elliptical beam incident on the surface forming a spot, the spot having a major axis aligned substantially along the intended direction of the crack, and controlling the energy of the beam so that the beam heats the surface to a temperature below the softening point of the material while simultaneously directing a stream of fluid coolant at an area of the heated surface which constitutes a cooling zone in the intended direction, the fluid coolant being displaced behind the heated target area by a chosen distance, wherein the rate of relative displacement between the beam and the body satisfies the equation:

$$V = ka(b+L)/\delta$$

where

V is the rate of relative displacement of the beam spot and the body;

k is a proportionality factor dependent on the thermophysical properties of the material of the body and a beam power density of the beam;

a is the length of said transverse minor axis;

b is the length of said longitudinal major axis;

L is the distance from the rear edge of the heat beam spot to the front edge of the cooling zone; and $\delta$ is the depth of the blind crack;

and including the further step of post heating the body, after the blind crack has been formed, along the line of the crack and to an extent sufficient to cause the depth of the crack to increase further, the post heating step being effected by means of a second beam of radiation impinging on the surface and moved relatively to the body along a path coincident with, or parallel to, the crack, yet offset from the centre of a curvilinear outline when cutting along the curvilinear outline.

14. A method of separating two portions of a body of brittle non-metallic material from each other including the step of forming a blind crack along a closed curve extending into the body to a given depth from a surface thereof, and in an intended direction along the surface, by effecting relative movement at a rate of relative displacement between the body and an elliptical target area on the surface thereof, said target area having a transverse minor axis and a longitudinal major axis, and being formed by directing an elliptical beam of coherent radiation towards the surface, the elliptical beam incident on the surface forming a spot, the spot having a major axis aligned substantially along the intended direction of the crack, and controlling the energy of the beam so that the beam heats the surface to a temperature below the softening point of the material while simultaneously directing a stream of fluid coolant at an area of the heated surface which constitutes a cooling zone in the intended direction, the fluid coolant being displaced behind the heated target area by a chosen distance, wherein the rate of relative displacement between the beam and the body satisfies the equation:

$$V = ka(b+L)/\delta$$

where

V is the rate of relative displacement of the beam spot and the body;

k is a proportionality factor dependent on the thermophysical properties of the material of the body and a beam power density of the beam;

a is the length of said transverse minor axis;

b is the length of said longitudinal major axis;

L is the distance from the rear edge of the heat beam spot to the front edge of the cooling zone; and $\delta$ is the depth of the blind crack;

and including the further step of first scoring the surface of the body along an incremental part of the desired crack to form a score, with the depth of the score being different at opposite ends thereof, and in which the beam of radiation is initially directed at that part of the score which is of greater depth.

15. The method of claim 14 including the preliminary step of making the score with a sharp body of hard material which is able to gouge out material from the surface of the body to a predetermined depth.

* * * * *